Figure 1:
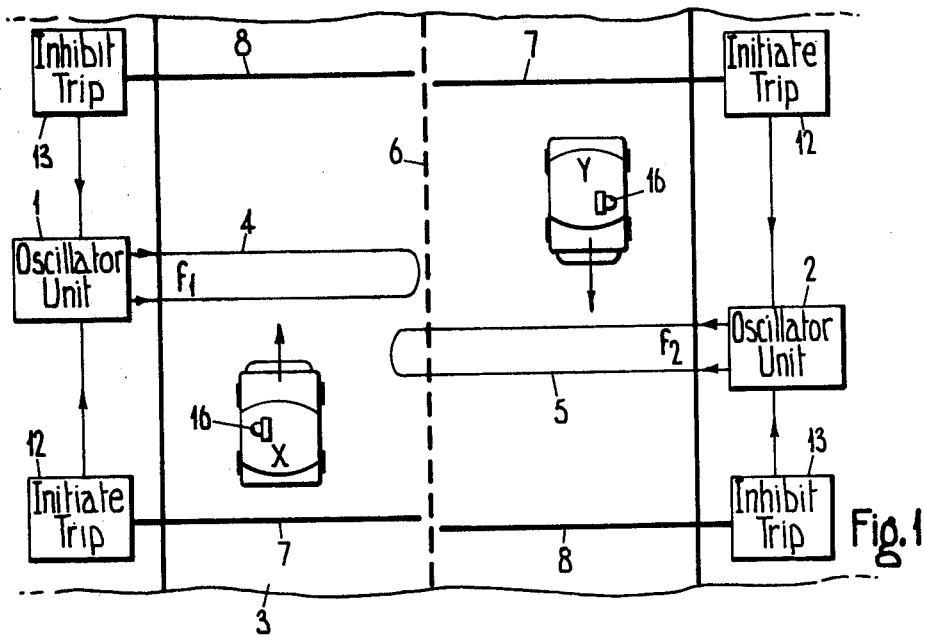

United States Patent

[11] 3,580,496

| [72] | Inventor | Donald William Neild<br>Gatley, England |
|---|---|---|
| [21] | Appl. No. | 676,356 |
| [22] | Filed | Oct. 18, 1967 |
| [45] | Patented | May 25, 1971 |
| [73] | Assignee | The General Electric Company Limited<br>London, England |
| [32] | Priority | Oct. 21, 1966 |
| [33] | | Great Britain |
| [31] | | 47,177/66 |

[54] COUNTING DEVICE INCLUDING AN ESCAPEMENT WITH NO AUTOMATIC RETURN BIAS
6 Claims, 5 Drawing Figs.

[52] U.S. Cl. ................................................ 235/92, 340/38
[51] Int. Cl. .......................................................... G08g 1/065
[50] Field of Search ............................................ 235/92-,111.1,21,290,36), 95, 96; 340/378—9, 38

[56] References Cited
UNITED STATES PATENTS

| 2,543,531 | 2/1951 | Lang | 235/92 |
| 2,613,791 | 10/1952 | Triman | 194/9 |
| 2,744,685 | 5/1956 | Lambert et al. | 235/92 |
| 3,179,918 | 4/1965 | Hoeppel | 340/32 |
| 3,440,600 | 4/1969 | Frech et al. | 340/23 |

Primary Examiner—Maynard R. Wilbur
Assistant Examiner—Joseph M. Thesz, Jr.
Attorney—Kirschstein, Kirschstein and Ottinger ABSTRACT: A counting device for use in a road toll charging or similar system having a counter driven by a long life clockwork-type mechanism whose escapement is controlled by input means responsive to signals radiated by roadside sources. The mechanism is sealed in a tamper-proof casing providing with means for indicating that it is operative. The toll system may produce an incomplete half unit registration when a vehicle carrying the counting device enters a road zone which unit is completed by a further half unit registration as the vehicle leaves the zone.

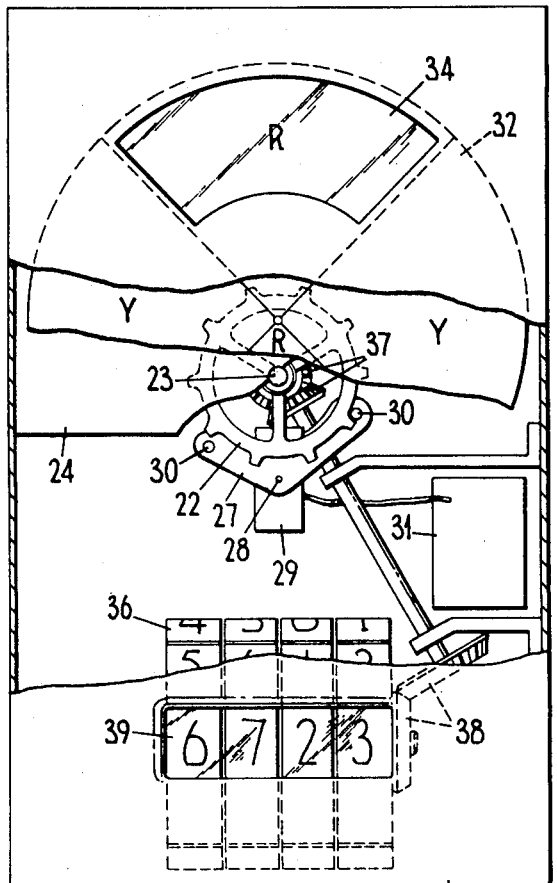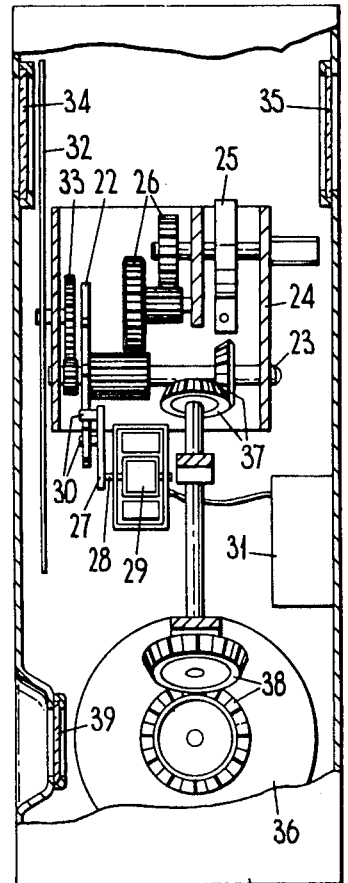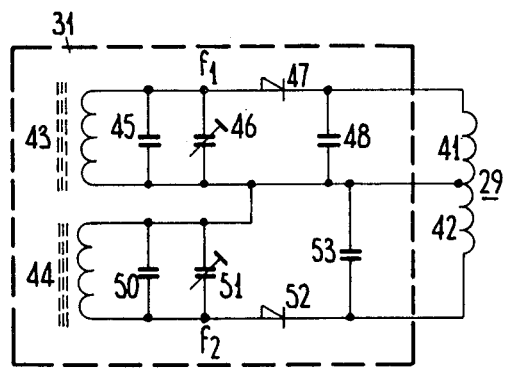

COUNTING DEVICE INCLUDING AN ESCAPEMENT WITH NO AUTOMATIC RETURN BIAS

This invention relates to counting devices designed to operate in response to input signals of radiated energy and to give an indication of the total number of such signals received over a given period of time.

The invention also relates to control systems in which an object traversing a given path carries such a counting device and one or more sources of said radiated energy are located at fixed points adjacent to the path and designed to radiate into the path energy which can be received by the counting device as the object carrying it passes by each fixed point so that the device indicates at any time the total number of passages of the object by the fixed points.

One such system, with which the invention is particularly concerned, is a road toll charging system in which sources of radiated energy are located at entry and exit points of a road for the use of which a charge is to be levied and vehicles using the road are each equipped with a counting device for indicating the number of times the road has been used, the charge being payable on this indication. The road might be, for example, a trunk road, or alternatively a road in a central zone of a large city when, for controlling traffic by restricting entry to avoid congestion of the zone, a charge is levied for entry by road into the zone, each such road leading into the zone being provided with energy radiating sources at fixed points for actuating the counting devices carried by the vehicles using the zone. It should be appreciated that the sources of radiated energy could also be sited at locations on the road other than entry and exit points.

The charge to be made is then assessed by inspection of the counting devices at intervals, which could be, for example, on the occasions of vehicle licensing in connection with zone-charging schemes as aforesaid.

For such use it is desirable to have a form of counting device which is reliable in operation, can be sealed against tampering, and is sufficiently compact to be readily attached to a vehicle, and one of the objects of the invention is to provide a form of counting device especially suitable for such use.

Counting devices in accordance with the invention are not, however, restricted to road toll charge uses and can be used in other forms of control systems, for example for security checks in indicating the number of times personnel enter restricted areas, or safety systems for indicating the number of times personnel are subjected to possibly harmful radiation, the personnel then carrying the counting devices in either such case.

The invention also includes within its scope all such control systems using the counting devices as now to be defined.

According to the invention a counting device includes in combination an escape member urged to move in a given direction by a spring but held by an escapement which can be operated by electromechanical means to release the escape member for a step of movement in said direction, a counter linked with the escape member so as to give a direct or proportionate indication of the number of said movement steps effected, and electrical circuit input means responsive to electromagnetic input signals of predetermined frequency arranged to actuate the electromechanical escapement-operating means so that the reading of the counter is determined by the number of input signals received, wherein the input means is arranged to be responsive to input signals of two different frequencies $f_1$ and $f_2$ and its output operates the electromechanical means in one manner for frequency $f_1$ but in a different manner for frequency $f_2$ such that following an operation of the escapement to produce a step of movement of the escape member in response to receipt of an input signal of the one frequency a further operation of the escapement to produce a further step of movement of the escape member in response to the receipt of a further input signal of that frequency can only take place after the receipt of an intervening input signal of the other frequency.

The term "escape member" as used herein means a member which is normally restrained from movement, but which can be released from such restraint for a step of movement as aforesaid.

Preferably the spring is of spiral form and by use of such a spring there can be obtained, for at least some purposes (and especially the road toll charging use aforesaid), a compact form of device which does not require connection to any external energy source and can be sealed within a casing having a window through which the counter can be observed.

Preferably the escape member consists of a toothed wheel and the escapement can then conveniently be of a pin-lever form of the kind used in clockwork mechanisms, for example a rocking lever having a pin at each end, said pins being arranged to engage the teeth of the escape wheel alternately in successive operations (i.e. rockings of the lever in opposite directions) of the escapement.

Preferably the electromechanical escapement-operating means consists of a permanent magnet-type moving coil arrangement and the input means is arranged to feed a direct electric current through the coil in different directions in response to the receipt of the input signals of different frequencies $f_1$ and $f_2$.

Rectifier circuits included in the input means can readily be designed to generate from the input signals direct electric current arranged to effect the actuation of the escapement-operating means so that the operation of the latter is effected solely by the energy of the input signals without the use of any internal electric battery.

The invention will be further described with reference to the use of a preferred form of counting device in accordance with it in a city-zone road vehicle toll system, which system is also an example of the systems included within the scope of the present application.

Figure 2:
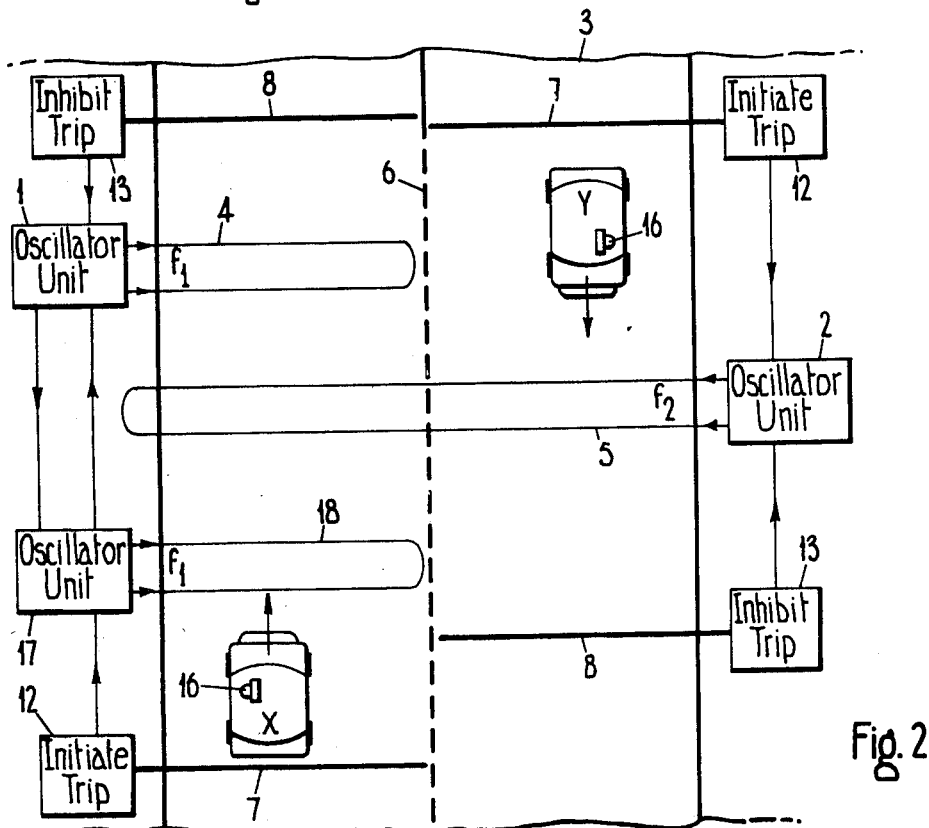

This form of counting device and system are illustrated in the accompanying drawings, in which:

FIG. 1 is a schematic plan of a portion of a roadway representing one of many boundary points of the system, FIG. 2 is a view similar to that of FIG. 1 of a modified system, FIG. 3 is a partly broken away diagrammatic front elevation of the counting device, FIG. 4 is a diagrammatic part-sectional side elevation of FIG. 3, and FIG. 5 is a circuit diagram of an electronic control unit including the radiation-responsive input means of the counting device.

Referring first to FIG. 1, the system incorporates for each boundary point a pair of electromagnetic transmitter oscillator units 1, 2 disposed at fixed positions one on each side of the roadway 3. Each oscillator unit includes a conducting loop 4, 5 respectively, preferably let into the road surface and extending to approximately the centerline 6 thereof but which may be mounted at the roadside. Alternatively, a ferrite-cored transmitter coil or other electromagnetic radiation transmitting means could be used.

In use, the loops 4, 5 are arranged to be fed from the transmitters with alternating current signals $f_1$, $f_2$ respectively, which are of different frequencies lying (for example) in the range 90 to 140 Kc./s.

The units 1, 2 can conveniently be made identical and fitted with means for selecting the different signal frequencies to be radiated for adapting each unit to its required use, and they can be fitted with a manual or time-operated switch for governing the periods that the system will operate.

Pneumatic trip devices 7, 8 which can be of conventional design may be installed if required near each leading and trailing sides of the loops 4, 5 respectively, arranged, in use, by means of associated initiating and inhibiting integrator circuits 12,13 to switch on and then off upon the passage of a vehicle over the pneumatic trips 7, 8.

Each vehicle (represented in the drawings as vehicle "X" entering the toll zone and vehicle "Y" leaving it) is fitted (for example, near its windscreen or a side window) with a counter device 16 adapted, in use, to respond to the different radiated frequency signals $f_1, f_2$ as the vehicle successively encounters the loops 4, 5 so as to give a visual indication to the driver of the vehicle, and an outside observer, that the vehicle has either entered or left a toll zone and that the device is functioning properly, and also to record and display an aggregate of such total use of toll zones for the purpose of charging over a period of time.

The system illustrated in FIG. 2 illustrates a method of extending the above system to double charging which might be required for some zones. For this purpose, a further transmitter oscillator unit 17 with an associated conducting loop 18 is installed at the entry point of the zone, arranged to transmit a signal $f_1$ corresponding to the frequency of the transmitter 1. The conducting loop 5, radiating the signal $f_2$, is extended across the full width of the roadway so as to be positioned between the loops 4 and 18. In effect, the arrangement causes the counter device 16 to register twice as the vehicle successively encounters the individual signals of that zone.

These and other features of the systems described above will be better understood in the description to the counting device itself shown in FIGS. 3, 4 and 5 to which reference will now be made.

The counting device 16 comprises a casing 21 provided with means (not shown) for detachably mounting it on the windscreen or other window of the vehicle. Mounted within the casing is a clockwork mechanism including an escape wheel 22 fixed to a shaft 23 which is journaled in a bracket 24, a clockwork spring motor 25 connected through gearing 26 to the wheel 22 for urging it to rotate in an anticlockwise direction (as viewed in FIG. 3), and a rocking pin-lever escapement 27 fixed to a spindle 28 of a permanent magnet-type moving coil device 29. Pins 30 of the lever 27 serve in well known manner to restrain the escape wheel against free rotation but permit intermittent rotation (i.e. one tooth at a time) when the lever 27 is actuated.

Also mounted within the casing 21 is an electronic control unit 31 which in response to one or other of the two different frequency signals $f_1, f_2$ is designed to supply an electric current to the moving coil 29 arranged to rotate the coil in one direction or the other for actuating the pin-lever 27 and thus allow the escape wheel 22 to move on through an angle equal to one tooth pitch. If for any reason signals of the same frequency are received consecutively by the device, then the second and subsequent signal will have no effect since the pin-lever 27 is prevented from rotating further in the same direction by the engagement of the pins 30 with the wheel 22.

An indicator disc 32 is rotatably mounted in the bracket 24 and connected to the escape wheel shaft 23 through gearing 33 designed to give a 90° rotation of the disc for each tooth pitch movement of the escape wheel 22. The disc is divided into alternately colored for example, red and yellow quadrants R and Y respectively. Two windows 34, 35 are provided at opposite sides of the casing for enabling the driver and an outside observer to recognize the particular colored quadrant displayed.

A decade counter 36 is mounted within the casing for providing a visual record of the aggregate of the step-by-step movements of the escape wheel 22 (and of the disc 32), and is also driven by the escape wheel shaft 23 through bevel gearing 37, 38. Only four digit wheels are shown provided to the counter 36 but more or less than these can of course be provided to suit the particular requirements. The numbers displayed by the counter are viewed through a window 39.

Referring particularly to FIG. 5, the winding of moving coil 29 is preferably formed as two half windings 41, 42. Then the control unit 31 incorporates two ferrite-cored receiver coils 43, 44 forming inductances of a pair of tuned circuits, so arranged that an alternating current signal is induced in he receiver coils on the passage of the vehicle over a conducting loop. The receiver coil 43 is coupled to a capacitor 45 and trimmer 46 which are tuned to resonate at the frequency $f_1$ so that in use, the alternating current signal produced when the vehicle passes over the conducting loop 4 is rectified by a diode 47 to charge a capacitor 48 from which direct current is fed from the unit 31 to the half winding 41 causing the moving coil to rotate in one direction. Similarly, the receiver coil 44, capacitor 50 and trimmer 51 are tuned to resonate at the frequency $f_2$ when the vehicle passes over the conducting loop 5, the developed signal being rectified by diode 52 to charge the capacitor 53 from which direct current is fed to the half winding 42 causing the moving coil to rotate in the other direction.

This bidirectional rotation of the moving coil provides the required rocking motion of the pin-lever 27 through the spindle 28 from one extreme position to the other for permitting the intermittent escape of the wheel 22.

Since the radiated frequency oscillations $f_1$ and $f_2$ will in fact couple both receiver coils 43, 44, it is arranged that the "Q" factor of each tuned circuit is sufficient to discriminate against frequencies other than that to which the circuit is tuned, so that no significant output will be obtained from the other circuit.

In operation of the arrangement shown in FIG. 1, each road vehicle, fitted with a counting device 16, will, upon entry to a toll zone boundary point, first initiate the operation of the transmitter oscillator unit 1 and then pass through the radiated electromagnetic field of frequency oscillations $f_1$ causing the moving coil 29 to rotate in one direction with the resultant movement of the indicator disc 32 through an angle of 90° so as to display the quadrant Y which indicates to the driver of the vehicle (and an outside observer) that he has entered a chargeable zone and that his counting device has operated. Simultaneously, the decade counter 36 will register half a unit by virtue of the design ratio of the gearing 38 employed, followed by the inhibition of the transmitter oscillator 1.

Upon leaving the zone, the same sequence of operations occur with the exception that the vehicle will pass through the field of the oscillations $f_2$ causing the moving coil 29 to rotate in the other direction and the indicator disc 32 to move through a further angle of 90° so as to display the quadrant R indicating that the vehicle has passed out of the zone. Again, simultaneously, the decade counter will register a further half unit thus completing a whole unit for the journey into and out of the zone.

The operation of the arrangement shown in FIG. 2 is similar to that already described above, the only difference being that the cycle of operations is repeated and therefore two complete units will be registered on the decade counter for the same excursion of a vehicle into a toll zone.

It will be seen from the foregoing description that a counting device constructed substantially as described provides a completely self-contained and compact clockwork powered integrator unit, which, except for periodic winding of the clockwork motor (if required, or at long intervals), can be sealed against unauthorized access, the motor being wound by an authority making the toll charge or alternatively the device could be constructed so as to have a continuous mechanical rewind resulting from movement of the vehicle. Means for producing an electrical rewind when required might alternatively be included in some cases.

Since the different vehicles using a system described above can be fitted with identical counting devices, the latter can be mass produced at relatively low cost.

I claim:

1. A counting device including in combination an escape member, a spring urging the escape member to move in a given direction, an escapement arranged to restrain such movement of the escape member, electromechanical means arranged to operate the escapement so as to release the escape member for a step of movement in said direction, a counter linked with the escape member so as to give a direct or proportionate indication of the number of said movement steps effected, and electrical circuit input means responsive to electromagnetic input signals of predetermined frequency arranged to actuate the electromechanical escapement-operating means so that the reading of the counter is determined by the number of input signals received, wherein the input means is arranged to be responsive to input signals of two different frequencies $f_1$ and $f_2$ and its output operates the electromechanical means in one manner for frequency $f_1$ but in a different manner for frequency $f_2$ such that following an operation of the escapement to produce a step of movement of the escape member in response to receipt of an input signal of the one frequency, a further operation of the escapement to produce a further step of movement of the escape member in response to the receipt of a further input signal of that frequency can only take place after the receipt of an intervening input signal of the other frequency.

2. A counting device according to claim 1, wherein the escapement consists of a rocking pin lever pivoted at its center and arranged to be rocked in opposite senses on receipt of the input signals of the different frequencies $f_1$ and $f_2$, and wherein the escape member consists of a toothed wheel driven by a spiral spring, each such rocking movement of the rocking pin lever releasing a pin at one end of the lever from a tooth of the escape wheel and permitting it to rotate under the urging of the spiral spring until the other pin engages another tooth of the escape wheel, said engagement being maintained until receipt of an input signal of the second frequency rocks the lever in the other sense.

3. A counting device according to claim 1, wherein the electromechanical escapement-operating means incorporates a permanent magnet-type moving coil device and the input means is arranged to feed a direct electric current through the coil in different directions in response to the receipt of the input signals of different frequencies $f_1$ and $f_2$.

4. A counting device according to claim 1, wherein the input means includes rectifier circuits designed to generate from the input signals direct electric current which is arranged to effect the actuation of the escapement operating means so that the operation of the latter is effected solely by the energy of the input signals.

5. A control system in which an object transversing a given path carries a counting device and one or more sources of electromagnetic signals are located at fixed points adjacent to the path and designed to radiate into the path electromagnetic signals which can be received by the counting device as the object carrying it passes by each fixed point so that the device can provide an indication of the total number of passages of the object by the fixed points, wherein the counting device is in accordance with claim 1 and the sources of electromagnetic signals are arranged to radiate signals of different frequencies $f_1$ and $f_2$ at spaced points such that the object is arranged to encounter the different signal frequencies in alternate succession.

6. A control system according to claim 5 wherein the path is a road and the objects are vehicles using the road, each of which vehicles is equipped with a said counting device which registers the amount of road usage for enabling a charge to be levied for the road usage.